United States Patent [19]

Kutman et al.

[11] 4,196,914

[45] Apr. 8, 1980

[54] CHUCK FOR AN EARTH BORING MACHINE

[75] Inventors: Arkady Kutman; Tiete O. Wolda, both of Orillia, Canada

[73] Assignee: Dresser Industries, Inc., Dallas, Tex.

[21] Appl. No.: 869,208

[22] Filed: Jan. 13, 1978

[51] Int. Cl.$^2$ .................. B23B 31/16; B23B 31/30
[52] U.S. Cl. .................................. 279/4; 279/121; 173/149; 173/43
[58] Field of Search ............. 279/121, 74, 4, 110; 173/43, 149

[56] References Cited

U.S. PATENT DOCUMENTS

| | | | |
|---|---|---|---|
| 3,212,591 | 10/1965 | Tucker | 173/149 |
| 3,301,334 | 1/1967 | Odgers et al. | 173/43 |
| 3,451,314 | 6/1969 | Smrekar | 279/4 |
| 3,456,956 | 7/1969 | Herbkersman | 279/121 |
| 3,533,636 | 10/1970 | Firestone et al. | 279/4 |
| 3,692,320 | 9/1972 | Lindelof et al. | 279/4 |
| 3,792,869 | 2/1974 | Braun | 279/4 |
| 3,992,019 | 11/1976 | Crawshay | 279/121 X |

*Primary Examiner*—Horace M. Culver
*Attorney, Agent, or Firm*—John M. Lorenzen

[57] ABSTRACT

Rotary and axial forces are transmitted through a chuck to a rotary drill string. The chuck clampingly engages the drill string to transmit rotary and axial forces. A multiplicity of jaw elements in the chuck contact the drill string. The chuck includes a lower jaw retaining means and an upper jaw retaining means. Disengageable means are provided connecting the lower jaw retaining means and the upper jaw retaining means. Jaw actuating means are provided for moving the jaw elements to and from a rod gripping and rod release position.

8 Claims, 3 Drawing Figures

1

CHUCK FOR AN EARTH BORING MACHINE

BACKGROUND OF THE INVENTION

The present invention relates in general to the art of earth boring and more particularly to a chuck for clampingly engaging an element of a rotary drill string or the like. Earth boring machines that drill by the rotary method utilize a drill string with a drill bit attached at the lower end. The drill string is rotated and forced downward causing the bit to penetrate into the earth. The earth boring machine that supplies the rotary and axial forces must have a chuck means for clampingly engaging the drill string. Difficulties have been encountered with prior art drilling machines with respect to the chuck means for clampingly engaging the drill string and applying the rotary and axial forces. The present invention provides an improved chuck apparatus for clampingly engaging the drill string. A multiplicity of jaws are provided positioned at intervals around the drill string thus improving their gripping ability and reducing the danger of damaging the drill string. The jaws may be easily removed from the earth boring machine and new jaws inserted in their place. This allows worn jaws to be replaced or sets of jaws for different size drill strings to be used in the same earth boring machine. A cover is removed and the jaws are simply withdrawn. The jaws are all connected together as a set which facilitates removal of the jaws and insures that the jaws will be retained together as a set during transit and storage. Means are provided for containing the jaw actuating spring pressure during removal of the jaws. Indicator means are connected to the jaw actuating means for indicating the position of the jaw actuating means.

BRIEF DESCRIPTION OF PRIOR ART

In U.S. Pat. No. 2,905,998 to W. L. Acker, Jr. patented Sept. 29, 1959, an automatic chucking device for drill pipes and the like is shown. The chucking device may be mounted on a drill rig to hold a pipe extending therethrough and is adapted to grip and release the pipe while the chuck is rotating. A pair of pivotal jaws have cam surfaces and lever arms thereon which force the pipe against fixed jaws when biasing means disposed between the lever arms of the jaws force the lever arms away from each other and the cam surfaces clamp tighter against the pipe. A plurality of fixed jaws are provided for gripping the pipe to restrain it from rotary and longitudinal movement and cooperating pairs of interconnected pivotally mounted jaws associated respectively with the fixed jaws are provided.

In U.S. Pat. No. 3,076,245 to W. L. Acker patented Feb. 5, 1968, an automatic chucking device for drill pipe is shown. The device includes positively biased, radially gripping jaws that grip the drill pipe with a controlled force applying mechanism provided to release the jaw grip to permit the drill pipe to be axially moved therethrough.

In U.S. Pat. No. 3,083,025 to E. C. Herbkersman patented Mar. 26, 1963, a chuck with detachable gripping jaws is shown. A chuck jaw carrier and jaw combination is provided in which the jaws are readily detachable from the respective carriers. Each jaw is connected to its carrier by a snap fastening whereby the jaw can be detached from its carrier by pulling the jaw relative to its carrier in the direction toward its gripping position. This permits the concurrent detachment of all jaws from the carriers in a relatively simple manner as an assembly, the storage of the jaws as an assembly in proper position for reconnection concurrently of all of the jaws to their carriers, and the concurrent reattachment of all the jaws to their respective carriers, and wherein the concurrent detachment and the concurrent reattachment can be effected by a simple operation of the chuck itself.

In U.S. Pat. No. 3,301,334 to I. D. Odgers et al patented Jan. 31, 1967, a drill rig is shown. In FIG. 8 a vertical section of the drill rod chuck and rotating means is shown. The chucking system is adapted to grip a drill rod for rotation during drilling.

In U.S. Pat. No. 3,692,320 to L. A. Lindelof et al patented Sept. 19, 1972, a chuck apparatus is shown. The chuck assembly includes a chuck body that mounts a plurality of jaw assemblies for radial movement between a rod clamping and rod release position. A chuck hood is axially moveable relative the body for releaseably retaining the jaw assemblies in a clamping position. A piston cylinder combination is provided for moving the hood relative the body to a jaw release position. A spring loading assembly is provided for resiliently urging the hood to a jaw clamping position that includes resilient mechanism that is retained in a compressed condition even though the hood is removed. A hydraulic swivelhead is provided for mounting the chuck assembly and rotating the chuck body relative the hood.

In U.S. Pat. No. 3,792,869 to L. A. Braun patented Feb. 19, 1974, a hydraulic chuck is shown. A chuck apparatus is mounted on a drive gear housing and a tubular drive spindle extends downwardly through the drive gear housing that includes a plurality of chuck jaws radially slideable extending through slots in the spindle. An annular retaining ring is bolted to the spindle to aid in mounting the jaws. An annular jaw actuator is mounted on the spindle for axial movement relative thereto. A chuck housing supports the actuator for rotary movement relative thereto in moving the actuator upwardly. Bearings for transmitting a downward force from the chuck housing to the actuator are provided. Piston cylinder combinations are dependingly mounted on the drive gear housing and in turn mounting the chuck housing. Said combinations are operable for moving the chuck housing axially relative the spindle. Springs are provided for resiliently urging the jaws radially outward.

SUMMARY OF THE INVENTION

The present invention provides an improved chuck for clampingly engaging an element of a rotary drill string and applying rotary and axial forces thereto. A multiplicity of individual jaw elements are positioned at intervals around the drill string thereby improving their gripping ability and reducing the danger of damaging elements of the drill string. The individual jaws can be quickly and easily removed from the earth boring machine and new jaws can be easily and quickly inserted in their place. This allows worn jaws to be replaced or sets of jaws for different size drill strings to be used in the same earth boring machine. A cover element is removed and the jaws are easily withdrawn or inserted. The jaws are all connected together as a set which facilitates removal of the jaws and insures that the jaws will be retained together as a set during transit and storage. Means are provided for containing the jaw actuating spring pressure during removal of the jaws. Indicator means are connected to the jaw actuating means for indicating the position of the jaw actuating means. The foregoing features and advantages of the present invention will become apparent from a consideration of the following detailed description of the invention when taken in consideration with the accompanying drawings.

DETAILED DESCRIPTION OF THE INVENTION

Figure 1:
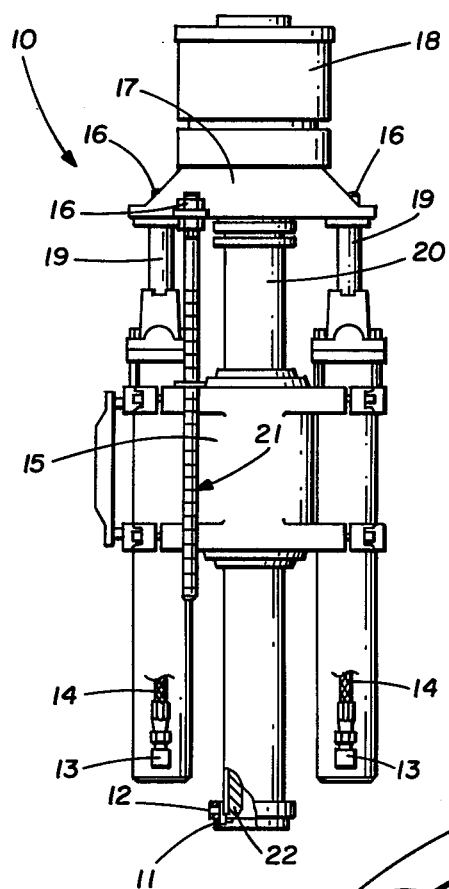
FIG. 1 illustrates a front view of an earth boring machine embodying the present invention.

Referring now to the drawings and in particular to FIG. 1, a drilling machine generally designated by the reference numeral 10 is shown. Drilling machines of this type are generally used for the drilling of core holes for mineral exploration and mining. These machines drill a borehole into the earth using a tubular drill string and a coring bit. The coring bit has a central opening that allows a portion of the earth formation being drilled to remain intact. This undisturbed earth formation or core is removed from the earth borehole by means of a retractable core barrel or other means and is analyzed to provide information about the earth formations.

Sections of the drill string extend through the drive tube bushing 22 and through the drive tube 20 and hydraulic chuck assembly 18. The chuck assembly will act to connect the drilling machine to the drill string for the transmission of rotary and axial forces in a manner that will be explained subsequently. The cylinder assemblies 19 provide an axial thrust force from the earth boring machine to the drill string. The cylinder assemblies 19 are connected to a thrust yoke assembly 17 by suitable bolts 16. Hydraulic fluid is transmitted to the cylinder assemblies 19 through the hydraulic lines 14. The hydraulic lines are connected to the cylinder assemblies by suitable connections 13. The bushing retainer key 12 and bushing retainer 11 are positioned at the lower end of the drive tube 20.

In order to more fully understand the chuck of this invention, the operation of the earth boring machine will be briefly described with reference to FIGS. 1 and 2. As this description proceeds it will become apparent that the chuck includes a number of important improved features. For example, an important feature is the direct acting spring arrangement. The springs act directly on the chuck bowl without intermediate force transfer means. Additionally, the chuck jaws may be removed without danger and without auxiliary spring holding means. Three of the releasing bolts extend through the cover when the chuck is engaged to give a positive indicator of engagement. Another feature of this chuck is the large number of jaws which grip the pipe. In addition, the system for evenly loading and driving these jaws is an important feature. Other chucks generally have only a few jaws. Additionally, each jaw set of the present invention is held together by two springs which maintain the integrity of the set and act as a release spring in operation.

The earth boring machine 10 includes a drive assembly and mechanical transmission located behind the swivelhead housing 15 which are well known to those skilled in the art. The earth boring machine 10 also includes a swivelhead housing 15 and a pair of vertical piston cylinder combinations having their cylinders mounted on the swivelhead housing 15 and their piston rods connected to the thrust yoke assembly 17. The cylinder assemblies 19 will move the thrust yoke assembly from a location close to the end of the swivelhead housing to a position remote from the swivelhead housing and back. Bearing 56 mounts the drive tube in the thrust yoke assembly for rotational as well as longitudinal movement. Longitudinal forces are transmitted from the cylinder assemblies through the thrust yoke and bearing to the drive tube; rotational forces are supplied to the drive tube 20 through drive gears located within the swivelhead housing in a manner well known in the art.

Figure 2:
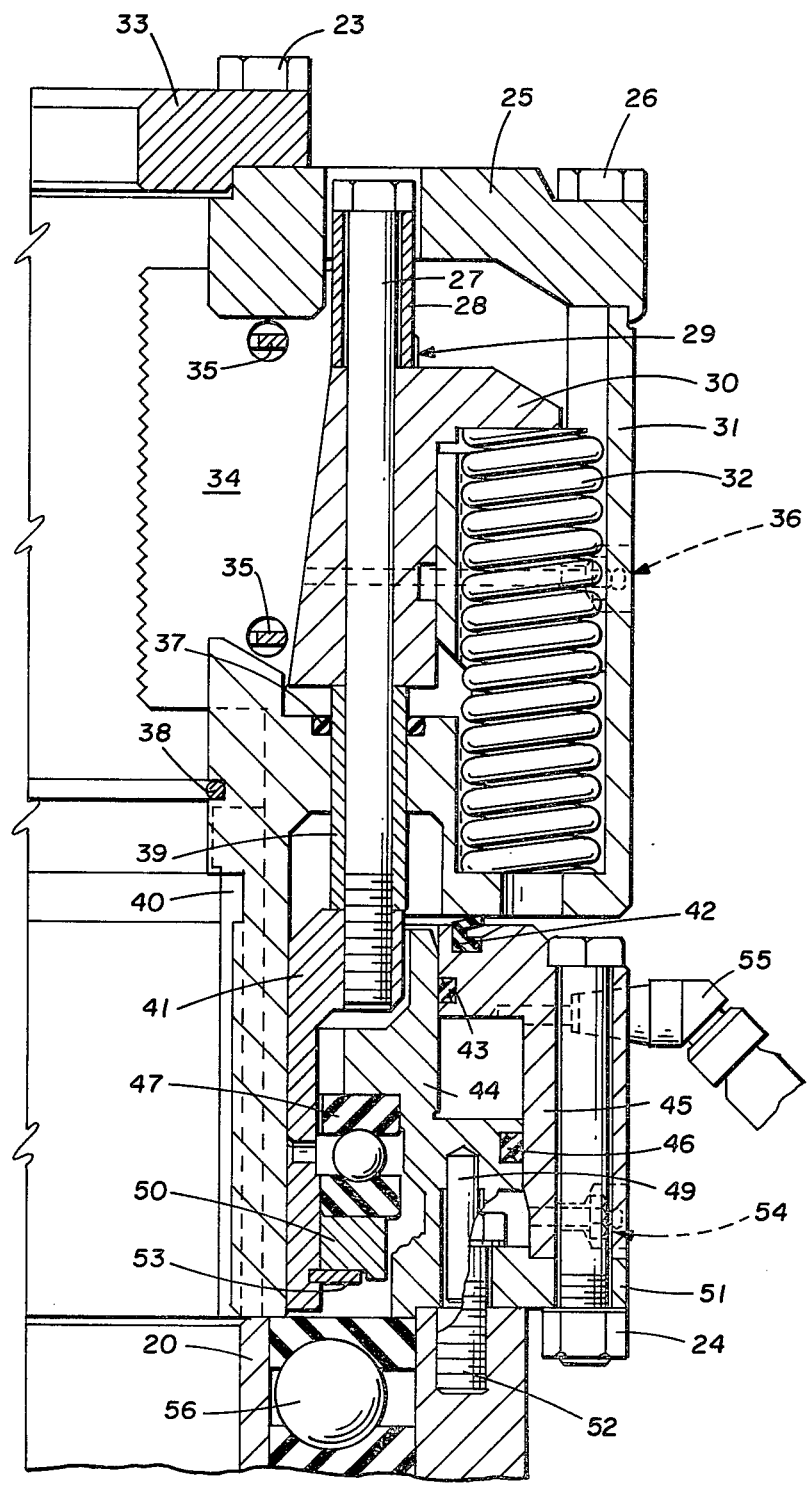
FIG. 2 is a vertical sectional view of the chuck of the earth boring machine shown in FIG. 1.

In FIG. 2, the chuck body 31 is threaded to the drive tube for longitudinal force transmission and keyed to the drive tube with keys 40 for rotational force transmission. The chuck body and the top cap 25 contain slots which house the chuck jaws 34 for transmission of rotational and longitudinal forces. Reciprocation of the chuck bowl 30 relative to the chuck jaws will cause the tapered inner surface of the bowl and the tapered outer surface of the chuck jaws to interact to move the chuck jaws radially into and out of contact with the drill string which is located on the centerline of the chuck. The chuck body 31 serves as a lower jaw retaining means. The chuck body or lower jaw retaining means 31 is connected to the chuck jaws 34 and allows the chuck jaws 34 to move radially into and out of contact with a drill rod. The top cap 25 serves as an upper jaw retaining means. The top cap or upper jaw retaining means 25 is connected to the chuck jaws 34 and allows the chuck jaws 34 to move radially into and out of contact with a drill rod. The top cap or upper jaw retaining means 25 is removably connected to the chuck body or lower jaw retaining means 31 by bolts 26. The bolts 26 serve as removable means connecting the upper jaw retaining means and the lower jaw retaining means. The bolts 26 allow the top cap 25 or upper jaw retaining means to be removed. The chuck jaws 24 can easily be withdrawn when the upper jaw retaining means 25 has been removed. Means are provided for containing the spring pressure of springs 32 when the top cap 25 has been removed. The bolts 27 contain the pressure of springs 32 when the top cap 25 has been removed.

Springs 32 will act to drive the chuck bowl up the taper of the chuck jaws and drive the chuck jaws into engagement with the drill string. This is an advantageous situation as it provides a normally engaged position when external power is removed. This prevents accidental dropping of the drill string in the hole and provides engagement during the normal drilling cycle of the machine.

Release of the chuck is accomplished by moving the chuck bowl against the action of spring 32. Force for the disengagement is transmitted from actuator sleeve 41 to the chuck bowl by bolts 27 and 29. Bolts 27 are equipped with spacer 28 so that they will be extended above the top cap when the chuck is engaged and recessed below the top cap when the chuck is released as a safety indicator for the operator. Proper position between the chuck bowl and the actuator sleeve is maintained by spacer 39. Thrust bearing 47 is mounted on the actuator sleeve along with back-up ring 50 and retainer ring 53. Thrust bearing 47 is necessary because piston 44 is held stationary on the thrust yoke by pin 49 while actuator sleeve rotates with the chuck body and the drive tube.

Cylinder 45 is attached to adapter plate 51 by bolts 24. The adapter plate is in turn connected to the thrust yoke assembly by bolt 52. Seals 46 and 43 between the piston and the cylinder provide a fluid cavity which when pressurized by hydraulic fluid through connection 55 from an external source will move the piston, thereby moving the actuator sleeve through the thrust bearing and in turn moving the chuck bowl against the action of spring 32. Two jaws springs 35 act to hold the chuck jaws outward against the chuck bowl. A chuck bushing 33 approximately centers the drill string in the chuck when the jaws are in the disengaged position preventing dragging of the pipe upon the disengaged jaws.

During normal drilling operation the chuck will be raised to a position above the earth formation being drilled. At that time pressure will be released through connection 55 allowing the springs 32 to force the chuck bowl and chuck jaws 34 into engagement with the drill string. The drive tube 20 will be rotated causing the chuck and the drill string to rotate while the hydraulic thrust cylinder assemblies 19 will be retracted causing the complete assembly to move downward into the earth, loading the drill bit and accomplishing the boring operation. When a cycle is complete as noted by the feed measuring rod 21, the chuck will be released by applying pressure through connection 55 to extend piston 44, thereby moving the chuck bowl downward against the spring 32 allowing the chuck jaws to move radially outward under spring 35 action and disengage from the pipe. At that time it is only necessary to extend cylinders 19 and repeat the operation to continue the boring cycle.

Figure 3:
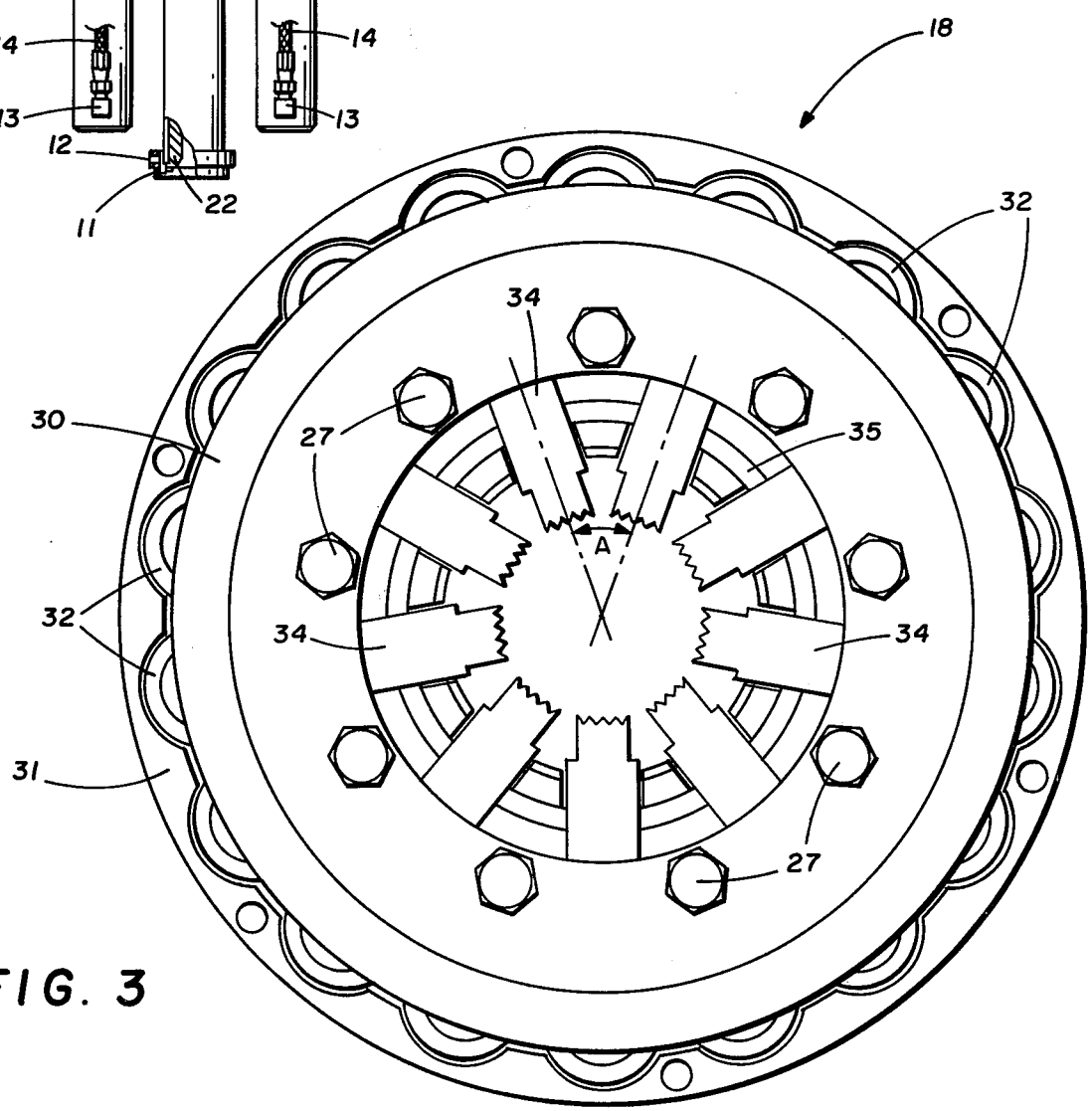
FIG. 3 is a horizontal section view of the chuck illustrating the location of the jaws of the chuck shown in FIG. 2.

Referring now to FIG. 3, a schematic diagram illustrating the location of the jaws 34 of the chuck 18 is shown. The jaws 34 are positioned to contact an element of the drill string that will be positioned in the central opening of the chuck 18. The prior art chucks provided a limited number of jaws that contacted the element of the drill string at a limited number of points. This could result in damage to thin walled elements of the drill string and/or limit the gripping ability of the chuck. The present invention provides jaws positioned around the element of the drill string at intervals of angle A. Angle A is preferred to be an angle of 40°. With the large number of jaws positioned around the element of the drill string extending through the central opening of chuck 18, the jaws 34 are able to grip the drill string with a better gripping force. In addition, the force can be applied to thin walled elements of the drill string without damaging such drill string elements.

The jaws 34 can be easily removed from the earth boring machine and new jaws inserted in their place. This allows worn jaws to be replaced or sets of jaws for different size drill strings to be used in the same earth boring machine. The cover 25 is removed and the jaws 34 are simply withdrawn. The jaws are all connected together as a set by the jaw springs 35 which facilitates removal of the jaws 34 and insures that the jaws will be retained together as a set during transit and storage. The bolts 27 contain the jaw actuating spring pressure during removal of the jaws.

The embodiments of the invention in which an exclusive property or privilege is claimed are defined as follows:

1. Chuck apparatus for clampingly engaging a drill rod or the like, comprising:
   a multiplicity of jaw elements for clampingly engaging a drill rod or the like;
   lower jaw retaining means connected to said jaw elements for allowing said jaw elements to move radially into and out of contact with said drill rod or the like;
   upper jaw retaining means connected to said jaw elements for allowing said jaw elements to move radially into and out of contact with said drill rod or the like;
   removable means connecting said lower jaw retaining means and said upper jaw retaining means for allowing said upper jaw retaining means to be removed;
   jaw actuating means for moving said jaw elements to and from a rod gripping and rod release position, said jaw actuating means including compressed spring elements that normally force said jaw elements to rod gripping position; and
   means for containing said spring elements in a compressed condition with said spring elements being so contained even when said upper jaw retaining means are removed.

2. Chuck apparatus for clampingly engaging a drill rod or the like; comprising:
   a multiplicity of jaw elements for clampingly engaging a drill rod or the like, said jaw elements adapted to be positioned around said drill rod or the like at substantially 40° intervals;
   lower jaw retaining means connected to said jaw elements for allowing said jaw elements to move radially into and out of contact with said drill rod or the like;
   upper jaw retaining means connected to said jaw elements for allowing said jaw elements to move radially into and out of contact with said drill rod or the like;
   removable means connecting said lower jaw retaining means and said upper jaw retaining means for allowing said upper jaw retaining means to be removed;
   jaw actuating means for moving said elements to and from a rod gripping and rod release position, said jaw actuating means including compressed spring elements that normally force said jaw elements to a rod gripping position; and
   means for containing said spring elements in a compressed condition with said spring elements being so contained even when said upper jaw retaining means are removed.

3. Chuck apparatus for clampingly engaging a drill rod or the like, comprising:
   a multiplicity of jaw elements for clampingly engaging a drill rod or the like;
   annular elements connecting said multiplicity of jaw elements;
   lower jaw retaining means connected to said jaw elements for allowing said jaw elements to move radially into and out of contact with said drill rod or the like;
   upper jaw retaining means connected to said jaw elements for allowing said jaw elements to move radially into and out of contact with said drill rod or the like;

removable means connecting said lower jaw retaining means and said upper jaw retaining means for allowing said upper jaw retaining means to be removed;

jaw actuating means for moving said jaw elements to and from a rod gripping and rod release position, said jaw actuating means including compressed spring elements that normally force said jaw elements to a rod gripping position; and means for containing said springs elements in a compressed condition with said spring elements being so contained even when said upper jaw retaining means are removed.

4. Chuck apparatus for clampingly engaging a drill rod or the like, comprising:
a multiplicity of jaw elements for clampingly engaging a drill rod or the like, said jaw elements adapted to be positioned around said drill rod or the like at substantially 40° intervals;

lower jaw retaining means connected to said jaw elements for allowing said jaw elements to move radially into and out of contact with said drill rod or the like;

upper jaw retaining means connected to said jaw elements for allowing said jaw elements to move radially into and out of contact with said drill rod or the like;

removable means connecting said lower jaw retaining means and said upper jaw retaining means for allowing said upper jaw retaining means to be removed;

jaw actuating means for moving said jaw elements to and from a rod gripping and rod release position, said jaw actuating means including an annular jaw actuating element and spring means positioned between said lower jaw retaining means and said annular jaw actuating element, said spring means noramlly forcing said jaw elements to a rod gripping position; and means for containing said spring means in a compressed condition with said spring means being so contained even when said upper jaw retaining means are removed.

5. Chuck apparatus for clampingly engaging a drill rod or the like, comprising:
a chuck housing having first jaw retaining means;

a multiplicity of jaw elements for clampingly engaging a drill rod or the like said first jaw retaining means being connected to said jaw elements for allowing said jaw elements to move radially into and out of contact with said drill rod or the like;

cover and second jaw retaining means connected to said jaw elements for allowing said jaw elements to move radially into and out of contact with said drill rod or the like;

removable means connecting said chuck housing and first jaw retaining means with said cover and said second jaw retaining means for allowing said cover and second jaw retaining means to be removed;

jaw actuating means for moving said jaw elements to and from a rod gripping and rod release position, said jaw actuating means including compressed spring elements that normally force said jaw elements to a rod gripping position; and means for containing said compressed spring elements in a compressed condition with said spring elements being so contained even when said cover and second jaw retaining means are removed.

6. Chuck apparatus for engaging a drill rod or the like comprising:
a multiplicity of jaw elements for clampingly engaging a drill rod or the like;

first jaw retaining means connected to said jaw elements for allowing said jaw elements to move radially into and out of contact with said drill rod or the like;

second jaw retaining means connected to said jaw elements for allowing said jaw elements to move radially into and out of contact with said drill rod or the like;

removable means connecting said first jaw retaining means and said second jaw retaining means for allowing removal and replacement of the jaw elements;

jaw actuating means for moving said jaw elements to and from a rod gripping and rod release position, said jaw actuating means including compressed spring elements that normally force said jaw elements to a rod gripping position; and means for containing said compressed spring elements with said compressed spring elements being contained during replacement of the jaw elements.

7. The apparatus of claim 6 including an annular jaw actuating element with said spring elements connected to said annular jaw actuating element said removable means being such that the second jaw retaining means may be removed without releasing the spring elements.

8. Chuck apparatus for clampingly engaging a drill rod or the like, comprising:
a multiplicity of jaw elements for clampingly engaging a drill rod or the like;

lower jaw retaining means connected to said jaw elements for allowing said jaw elements to move radially into and out of contact with said drill rod or the like;

upper jaw retaining means connected to said jaw elements for allowing said jaw elements to move radially into and out of contact with said drill rod or the like;

removable means connecting said lower jaw retaining means and said upper jaw retaining means for allowing said upper jaw retaining means to be removed;

jaw actuating means for moving said jaw elements to and from a rod gripping and rod release position, said jaw actuating means including compressed spring elements that normally force said jaw elements to a rod gripping position;

means for containing said compressed spring elements in a compressed condition with said spring elements being so contained even when said upper jaw retaining means are removed; and indicator means connected to said jaw actuating means for indicating the position of said jaw actuating means.

* * * * *